United States Patent
Herbert et al.

(10) Patent No.: US 7,093,498 B2
(45) Date of Patent: Aug. 22, 2006

(54) MICROELECTROMECHANICAL STRAIN GAUGE WITH FREQUENCY DETECTOR

(75) Inventors: Patrick C. Herbert, Mentor, OH (US); Richard D. Harris, Mentor, OH (US); Frederick M. Discenzo, Brecksville, OH (US); Michael J. Knieser, Fortville, IN (US); Robert J. Kretschmann, Bay Village, OH (US); Mark A. Lucak, Hudson, OH (US); Robert J. Pond, Doylestown, OH (US); Louis F. Szabo, Broadview Heights, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 90 days.

(21) Appl. No.: 10/675,642

(22) Filed: Sep. 30, 2003

(65) Prior Publication Data

US 2005/0068989 A1    Mar. 31, 2005

(51) Int. Cl.
*G01B 7/16* (2006.01)
(52) U.S. Cl. ...................................................... 73/778
(58) Field of Classification Search .......... 73/777–781, 73/862.59
See application file for complete search history.

(56) References Cited

U.S. PATENT DOCUMENTS

| | | | | |
|---|---|---|---|---|
| 5,188,983 A | * | 2/1993 | Guckel et al. ........... | 73/862.59 |
| 5,511,427 A | * | 4/1996 | Burns ........................... | 73/708 |
| 5,565,625 A | * | 10/1996 | Howe et al. .............. | 73/514.16 |
| 5,583,290 A | * | 12/1996 | Lewis ...................... | 73/862.61 |
| 5,610,335 A | * | 3/1997 | Shaw et al. .............. | 73/514.36 |
| 5,646,347 A | * | 7/1997 | Weiblen et al. .......... | 73/514.32 |
| 5,763,782 A | * | 6/1998 | Moore et al. ............ | 73/514.18 |
| 5,767,405 A | * | 6/1998 | Bernstein et al. ........ | 73/504.16 |
| 5,786,621 A | * | 7/1998 | Saif et al. .................... | 257/415 |
| 6,341,528 B1 | | 1/2002 | Hoffman | |
| 6,606,913 B1 | * | 8/2003 | Gianchandani .............. | 73/777 |
| 6,864,767 B1 | * | 3/2005 | Streeter et al. ............... | 335/78 |

OTHER PUBLICATIONS http://xenia.media.mit.edu/~verp/projects/smartpen/node43.html, Vibrating Beam Accelerometer.
http://www.sensorland.com/HowPage048.html, How Sensors Work—Vibrating Beam Sensors.

* cited by examiner

*Primary Examiner*—Max Noori
(74) *Attorney, Agent, or Firm*—Quarles & Brady, LLP; Alexander R. Kuszewski

(57) ABSTRACT

A microelectromechanical system (MEMS) strain gauge includes at least one flexible arm that can be caused to oscillate. Transverse strain on the arm changes the resonant frequency of the arm. A detector communicating with the flexible arm may detect the frequency of oscillation to provide, an indication of the transverse strain of the substrate.

36 Claims, 3 Drawing Sheets

MICROELECTROMECHANICAL STRAIN GAUGE WITH FREQUENCY DETECTOR

CROSS-REFERENCE TO RELATED APPLICATIONS

BACKGROUND OF THE INVENTION

The present invention relates to microelectromechanical systems (MEMS) and in particular, to a MEMS device used to measure strain.

Conventional strain gauges are made of wire or foil (metal) or a semiconductor material that is mounted to the surface of the object. As the underlying object is strained, the strain is transferred to the strain gauge material and a change in electrical resistance is exhibited proportional to the deformation (i.e. strain) of the strain gauge material. In addition to resistance, capacitance, inductance or reluctance may also be used to establish a measure of strain. Some semiconductor strain gauges are made of a piezoresistive material such as silicon. As the piezoresistive material is stressed, the fundamental materials properties of the material change causing the resistance to change. This change in electrical resistance is measured to provide an indication of the stress in the piezoresistive material and therefore also an indication of the strain in the underlying object.

MEMS devices are extremely small machines fabricated using integrated circuit techniques or the like. The small size of MEMS devices makes possible the mass-production of high-speed, low-power, high sensitivity, and high-reliability mechanisms that could not be realized on a larger scale.

It would thus be desirable to provide a MEMS device that can be mounted onto an underlying object that is operable to provide an indication of strain experienced at the object. It would furthermore be desirable to measure the strain at a plurality of locations over an area.

BRIEF SUMMARY OF THE INVENTION

In one aspect of the invention, a microelectromechanical system (MEMS) strain gauge providing measurement of strain of an object is provided. The strain gauge includes a substrate having a surface that is attachable to the object. The strain gauge further includes a longitudinally extending beam. At least one flexible arm has first and second ends attached to the substrate, and also has a middle portion supporting the beam above the substrate. A detector communicates with the beam for detecting a frequency of vibration of the beam to provide a measure of strain of the object.

The above aspects of the invention are not intended to define the scope of the invention for which purpose claims are provided. In the following description, reference is made to the accompanying drawings, which form a part hereof, and in which there is shown by way of illustration, and not limitation, a preferred embodiment of the invention. Such embodiment does not define the scope of the invention and reference must be made therefore to the claims for this purpose.

BRIEF DESCRIPTION OF THE DRAWINGS

FIG. 3 is a block diagram showing a first embodiment of the present invention in which the actuator receives periodic impulses and the detector detects a resonant frequency of oscillation of the beam in response to the impulse and the detector output is sent to a microprocessor which in turn outputs a digital or analog signal that may be communicated to a larger system or the like;

FIG. 6B is a block diagram showing the strain gauge illustrated in FIG. 6A in which the actuator receives periodic impulses and the detector detects a resonant frequency of oscillation of the transverse flexible arm in response to the impulse and the detector output is sent to a microprocessor which in turn outputs a digital or analog signal that may be communicated to a larger system or the like.

DETAILED DESCRIPTION OF THE PREFERRED EMBODIMENT

Figure 1:
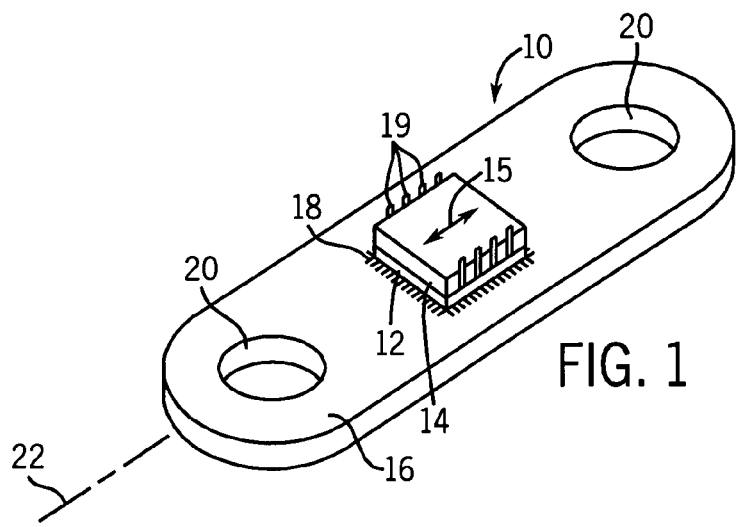
FIG. 1 is a perspective view of the packaged MEMS strain gauge per the present invention showing attachment of the substrate of the MEMS device to a mechanical link which will be strained.
Figure 2A:
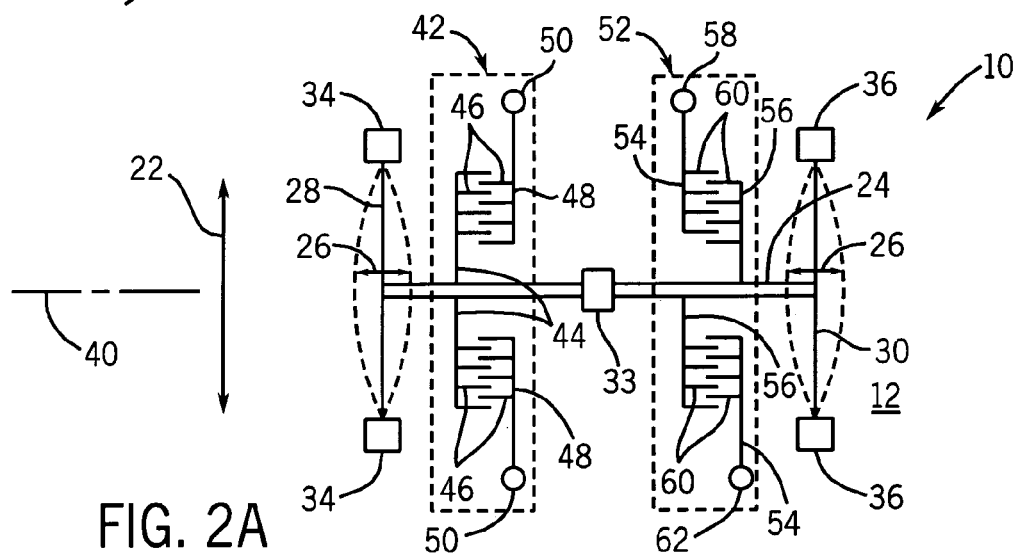
FIG. 2A is a schematic representation of the MEMS strain gauge of FIG. 1 as fabricated on the substrate, showing a longitudinal beam supported on two transverse flexible arms, the latter which are directed along the strain, and showing an actuator for applying force to the beam and a detector for detecting movement of the beam.

Referring now to FIG. 2A, a MEMS strain gauge 10 may be fabricated using integrated circuit techniques or the like on a substrate 12, for example, a silicon substrate. The MEMS strain gauge 10 includes a beam 24 suspended parallel to and above the substrate 12 and extending perpendicularly to a strain axis 22 of an underlying device (see, for example, FIG. 1). The beam 24 is suspended by transversely extending flexible arms 28 and 30 which are parallel to the strain axis 22. A first end of the beam 24 is attached to the center of flexible arm 28, and a second end of the beam 24 is attached to the center of the flexible arm 30.

Pylon pairs 34 and 36 support the ends of the flexible arms 28 and 30, respectively, extending upward from the substrate 12 with the flexible arms 28 and 30 directly attached at their tops or attached to the pylon pairs 34 and 36 through temperature compensating structures as is described in U.S. Pat. No. 6,617,750 issued Sep. 9, 2003, assigned to the assignee of the present invention and hereby incorporated by reference. Temperature compensating structures reduce the expansion and contraction that can be induced in the substrate 12 resulting from temperature fluctuations. While the temperature compensating structure would thus reduce the sensitivity of strain gauge 10, it may sometimes be desirable to minimize temperature-induced strain. Alternatively, the sensitivity of strain gauge 10 can be increased, and the strain gauge output can include temperature-induced strain, by connecting pylon pairs 34 and 36 to the substrate 12 without implementing temperature compensating structures.

The flexible arms 28 and 30 enable the beam 24 to translate along a longitudinal axis 40 perpendicular to the strain axis 22 that extends generally parallel to the flexible arms 28 and 30.

The attachment of the flexible arms 28 and 30 to the substrate 12 causes the flexible arms 28 and 30 to be stretched with any strain of the substrate 12 along strain axis 22. If it is anticipated that it will be desirable to measure compression (i.e. negative strain) of the underlying object, then it will be necessary to pre-stress the flexible arms during fabrication, so that the compression will result in a reduced stress in the arms. The amount of total strain in the substrate controls the amount of stress in the arms. The beam 24 thus forms a spring mass oscillator with the flexible arms 28 and 30 whose natural frequency of oscillation will depend according to well-known formulas in part on the stress of the flexible arms 28 and 30. The stress in the arms will change the stiffness, i.e. the spring constant. The value of the natural frequency, $f_n$, is given by:

$$f_n = (k/m)^{1/2} \quad (1)$$

where k is the spring constant of the structure and m is the mass of the structure. It should be noted that the resonant frequency of the system, $f_r$, observed experimentally is slightly lower than the natural frequency, given in Eq. 1, and is related to $f_n$ by:

$$f_r = f_n (1 - \tfrac{1}{2} Q^2)^{1/2} \quad (2)$$

where Q is the quality factor of the second order mechanical system.

For this reason, the resonant frequency of oscillation of beam 24 will depend on the strain of substrate 12. Accordingly, when substrate 12 is attached to an underlying object, the stress passed to the flexible arms will reflect the strain in the underlying object.

The beam 24 and flexible arms 28 and 30 may be constructed, for example, of silicon etched from the substrate using techniques described in U.S. patent applications Ser. No. 09/843,563 filed Apr. 26, 2001 and Ser. No. 09/963,936 filed Sep. 26, 2001 and Ser. No. 10/002,725 filed Oct. 25, 2001, assigned to the assignee of the present invention and hereby incorporated by reference. If desired, an optional insulating bridge 33 of silicon dioxide, or other insulating material, may be formed into the beam 24 dividing the beam 24 into two ends, each communicating with only one of the flexible arms 28 and 30. An upper metallization layer may be applied to the beam 24 and flexible arms 28 and 30, and the pylons 34 and 36. If insulating bridge 33 is implemented, the upper metallization layer would not be applied to the bridge in order to provide electrical isolation to each of the divided segments of the beam 24.

Referring still to FIG. 2A, an actuator 42 may be attached to the beam 24 so as to provide for a longitudinal force on the beam 24 via electrical stimulation. In particular, a set of movable capacitor plates 44 is attached to the leftmost end of beam 24 between transverse flexible arms 28 and 30 extending transversely out therefrom on either side. The capacitor plates 44 present longitudinal interdigitating fingers 46 to an opposed pair of stationary capacitor plates 48 having corresponding interdigitating fingers 46 and positioned adjacent to the right of the movable capacitor plates 44. The stationary plates 48 in turn connect the pylons 50 attached to the substrate. The capacitor plates 44 and 48 are metallized and electrical connection to each of plates 44 and 48 may be had via pylons 34 and 50, respectively. A voltage placed across pylons 50 and 34 thus produces an attractive electrostatic force across the plates 44 and 48 and thus a longitudinal force on beam 24 according to methods well known in the art. The generation of electrostatic forces and the corresponding effect on longitudinal beam movement is further described in U.S. Pat. No. 6,583,374, assigned to the assignee of the present invention and hereby incorporated by reference.

Attached to a rightmost end of the beam 24 may be a detector 52 comprised of similar movable capacitor plates 56 and opposing stationary capacitor plates 54, the former attached to either side of the beam 24 at its rightmost end and the latter attached to pylons 58 and 62 flanking the beam 24 and attached in turn to the substrate 12. Again, the opposed plates may have interdigitated fingers 60 to increase the capacitance surface area so as to linearize their operation with movement of the beam 24. If beam 24 includes insulating portion 33, the insulator would isolate detector 52 from voltages originating at actuator 42 that might otherwise travel along beam 24.

Unlike the capacitor plates 48 and 44, the movable capacitor plate 56 extending on the upper side of the beam 24 is to the right of its corresponding stationary capacitor plate 54 while the movable capacitor plate 56 extending on the lower side of the beam 24 is to the left of its corresponding stationary capacitor plate 54. It will be understood, therefore, that capacitances formed between these plates 54 and 56 on different sides change in opposite directions with motion 26 of the beam 24. In particular, a leftmost movement of beam 24 decreases the capacitance formed by the upper plates 54 and 56 and increases the capacitance formed by the lower plates 54 and 56, and vice versa with rightward movement of beam 24. Connection to the capacitors formed by the upper capacitor plates may be made through terminals formed by pylon 58 and pylon 36, while connections to the capacitors formed by the lower capacitor plates may be made through terminals formed by pylon 62 and pylon 36. The relative value of these capacitors may be measured by a detector incorporating capacitance measurement circuitry disclosed in U.S. Pat. No. 6,501,282 issued Dec. 31, 2002 hereby incorporated by reference to provide an indication of the position of the beam 24.

Figure 2B:
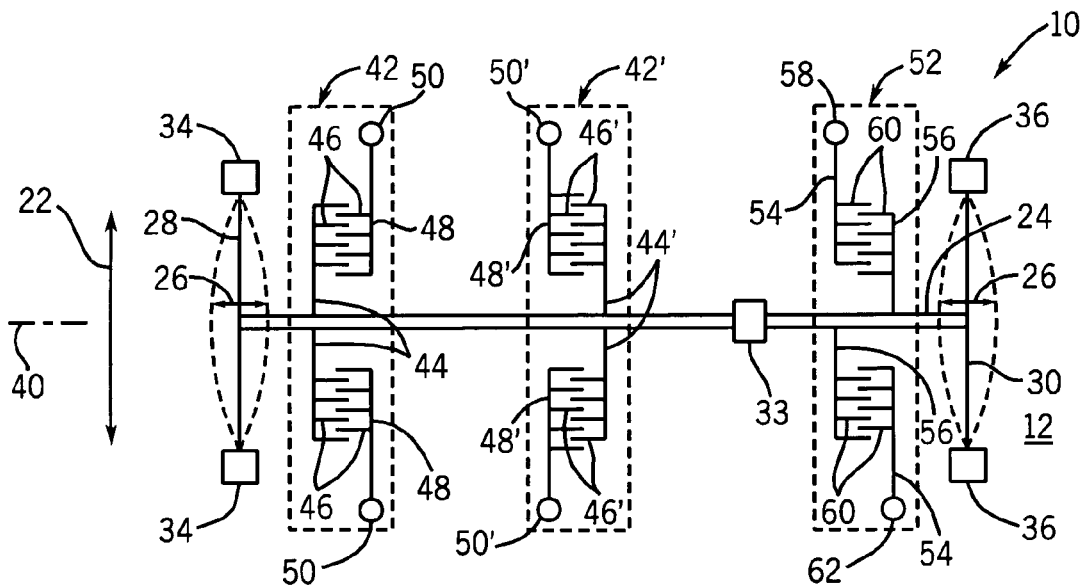
FIG. 2B is a schematic representation of the MEMS device strain gauge of FIG. 1 constructed similar to that illustrated in FIG. 2A, but having a second actuator for applying a force to the beam opposite the force of the actuator illustrated in FIG. 2A.

Referring now also to FIG. 2B, MEMS strain gauge is illustrated as including a second actuator 42' in accordance with an alternate embodiment. In particular, actuator 42' may be attached to the beam 24 at a location adjacent first actuator 42 so as to provide for a longitudinal force on the beam 24 via electrical stimulation in the manner provided by actuator 42. However, the force provided by actuator 42' is opposite the force provided by actuator 42, as will now be described.

In particular, a set of movable capacitor plates 44' is attached to beam 24 between transverse actuator 42 and detector 52 extending transversely out therefrom on either side. The capacitor plates 44' present longitudinal interdigitating fingers 46' to an opposed pair of stationary capacitor plates 48' having corresponding interdigitating fingers 46' and positioned adjacent to the left of the movable capacitor plates 44'. The stationary plates 48' in turn connect the pylons 50' attached to the substrate. The capacitor plates 44' and 48' are metallized and electrical connection to each of plates 44' and 48' may be had via pylons 34 and 50', respectively. A voltage placed across pylons 50 and 34 thus produces an attractive electrostatic force across the plates 44 and 48 and thus a longitudinal force on beam 24, as described above. It should be appreciated that capacitor plates 44' and 48' are oriented opposite to capacitor plates 44 and 48 of actuator 42. Accordingly, a voltage placed across pylons 50' and 34, actuator 42' provides an electrostatic force in a direction opposite to that of actuator 42.

Actuators 42 and 42' thus can operate in tandem to translate beam 24 in both longitudinal directions. It may be desirable, for instance, to initially calibrate MEMS device 10 and position the upper and lower sets of capacitor plates 54 and 56 equally, thereby maximizing the range of beam movement during operation. The calibration is achieved by applying a voltage to pylons 34, and further selectively applying a voltage to either pylons 50 or 50', depending on the desired direction of beam movement. The beam position can be adjusted until the desired position is attained by obtaining a substantially equal capacitance formed by the upper capacitor plates 54 and 56 and the lower capacitor plates 56 and 54. During operation, only one actuator 42 would be used to vibrate beam 24.

While actuator 42' is illustrated as being positioned between actuator 42 and detector 52 (and electrically isolated from detector 52 via insulating portion 33), it should be appreciated that actuator 42' can alternatively be positioned anywhere on beam 24.

As noted, the structure formed by the beam 24 and flexible arms 28 and 30 has a mechanical resonant frequency that will be dependent upon the stress in the flexible arms which is indicative of the underlying strain along strain axis 22. This resonant frequency may then be measured as follows: A voltage impulse is applied to actuator 42 which results in a mechanical impulse being applied to the structure, i.e. the structure is quickly moved to one side and released. It will then vibrate back and forth at its resonant frequency and with decreasing amplitude until the motion 26 dies out. The motion 26 is monitored by detecting changes in the capacitances formed by plates 54 and 56. Such motion may also occur from naturally occurring environmental shocks to the MEMS strain gauge.

Figure 3:
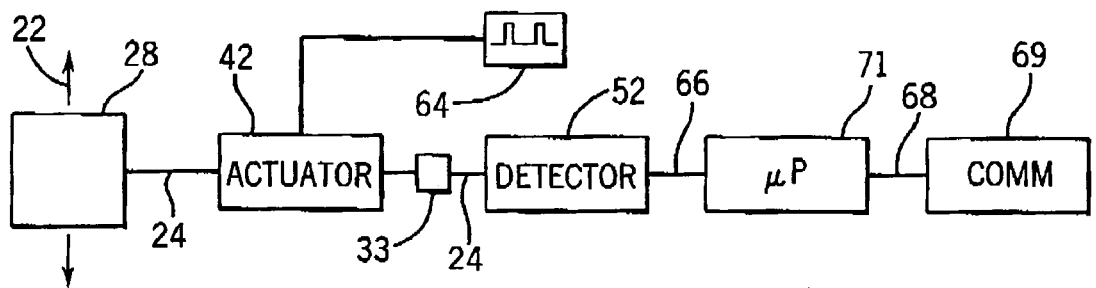

Referring now to FIG. 3, in this latter case, the actuator 42 may receive periodic electrical impulses from an oscillator 64 either external to the MEMS strain gauge 10 or fabricated on the substrate 12. Oscillator 64, in addition to other system components, can receive power from a power source integrated with MEMS device 10. Each of these impulses from oscillator 64 will cause an oscillation of the beam 24 at its resonant frequency enveloped by a decaying exponential waveform. These oscillations are monitored by the capacitance detector 52. Counting the zero crossings where the capacitance of the upper and lower capacitors of detector 52 are equal or other similar trigger points on the waveform of motion 26 of the beam 24 using a simple counter circuit or other frequency detecting circuit, for a fixed period of time, provides a measurement of the frequency of motion 26 of the beam 24.

Microprocessor 71 may preferably includes a capacitance sense circuit that receives and senses capacitance output 66 from the detector 52, and produces a digital output 68 that can be read by other system components to ultimately provide an output to the user. These other system components may be either integrated with the MEMS device or be discrete components electrically connected to the MEMS device, or some combination thereof. Output 68 can alternatively be an analog signal throughout this disclosure. Alternatively, device 10 can include a separate capacitance sense circuit, connected between detector 52 and microprocessor 71, that receives capacitance output 66. As illustrated, the analysis of the capacitance values takes place in the microprocessor 71. Microprocessor 71 can further communicate with a memory (not shown) to store and later retrieve statistical data accumulated during operation.

It should be appreciated that microprocessor 71 can be local, as illustrated, or alternatively remote from MEMS device 10 and receive signals from detector 52 as described above. In the case where the frequency detection is simply a counter enabled for a predetermined period of time, a digital frequency value 68 is produced which may be read by the rest of the electronic system components. In accordance with the preferred embodiment, the actuator 42 provides a series of pulses whose period is such that the motion 26 of beam 24 will decay to zero before the next pulse is applied An empirically derived calibration curve may be used to convert this frequency into an absolute strain measurement of the underlying object or relative strain may be deduced being simply a change in frequency.

Figure 4:
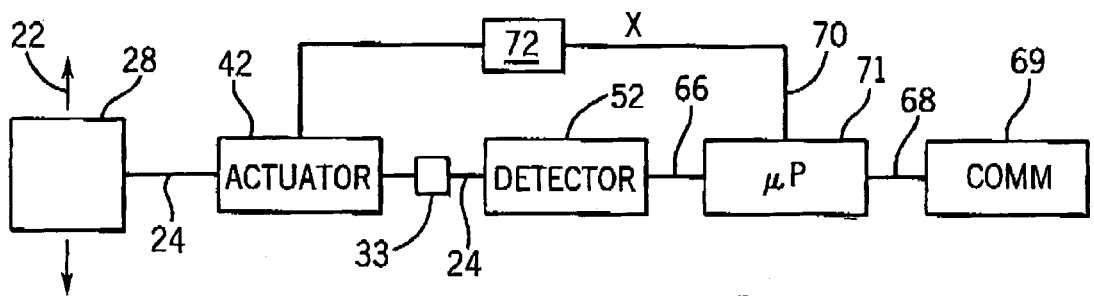
FIG. 4 is a figure similar to that of FIG. 3 showing an alternative embodiment in which a feedback loop is established between the detector and actuator for providing continuous oscillation of the beam at its resonant frequency.

Referring now to FIG. 4 in an alternative embodiment, the microprocessor 71 may provide an analog position signal 70, for example, being a function of the difference between the two capacitances formed by the upper capacitor plates 54 and 56 and the lower capacitor plates 56 and 54. This instantaneous position signal 70 may be used to monitor the amplitude of the structure's motion 26. The amplitude will be a maximum when the structure is continually forced to oscillate at its resonant frequency. Feedback circuitry 72 can measure the amplitude by monitoring the capacitors 52, and continuously varying an ac oscillation to actuator 42 so as to keep the amplitude at its maximum. The frequency of oscillation that feedback circuitry 72 needs to apply to actuator 42 to keep the amplitude at a maximum is the resonant frequency of the structure. This resonant frequency is reflective of the stress in the structures according to the above equation, and therefore reflective of the strain in the underlying structure. It should be appreciated that feed back circuitry 72 can provide a stand-alone oscillator as described above with reference to oscillator 64.

Resonant frequency can be attained by feedback circuitry 72 sweeping a wide range of frequencies by outputting a sinusoidal waveform covering a wide frequency range, including the resonant frequency of the structure. Once the resonant frequency has been determined, feedback circuitry can sweep the sinusoidal waveform over a narrower frequency range about the previously determined resonant frequency to continuously determine the resonant frequency of the structure. The narrower sweep range would account for possible drift or shift in the resonance frequency as the structure undergoes strain.

In an additional alternative embodiment, the generator 64 can provide a continual ac (e.g., sinusoidal) driving force to the structure at a predetermined frequency. Monitoring of the amplitude of the motion 26 due to this driving force is another monitor of the stress in the flexible arms and therefore of the strain in the substrate.

Referring again to FIG. 4, microprocesor 71 can further be connected to a temperature sensor (not shown) disposed anywhere on MEMS device 10 or on substrate 12 at a location proximal MEMS device 10. The temperature sensor would be connected to microprocessor 71 and communicate temperature values. The microprocessor 71 can be provided with a calibration curve that indicates changes in oscillation frequency, stiffness, and expansion as a function of thermal changes. The microprocessor can adjust the position signal 70 accordingly such that feedback circuitry 72 will drive actuator 42 to compensate for the thermal effects.

It should be appreciated that a communication module 69 can optionally be integrated onto MEMS device 10 illustrated in FIGS. 3 and 4. Communication module 69 receives output 68 and is operable to communicate the output to other MEMS devices 10, such as when an array of sensors 10 are dispersed about an object for strain measurement, or to a central processor receiving input from a plurality of MEMS devices 10. Communication module can operate under IR and RF communication or, alternatively, can communicate using a hard wire as well known by one having ordinary skill in the art.

Figure 7:
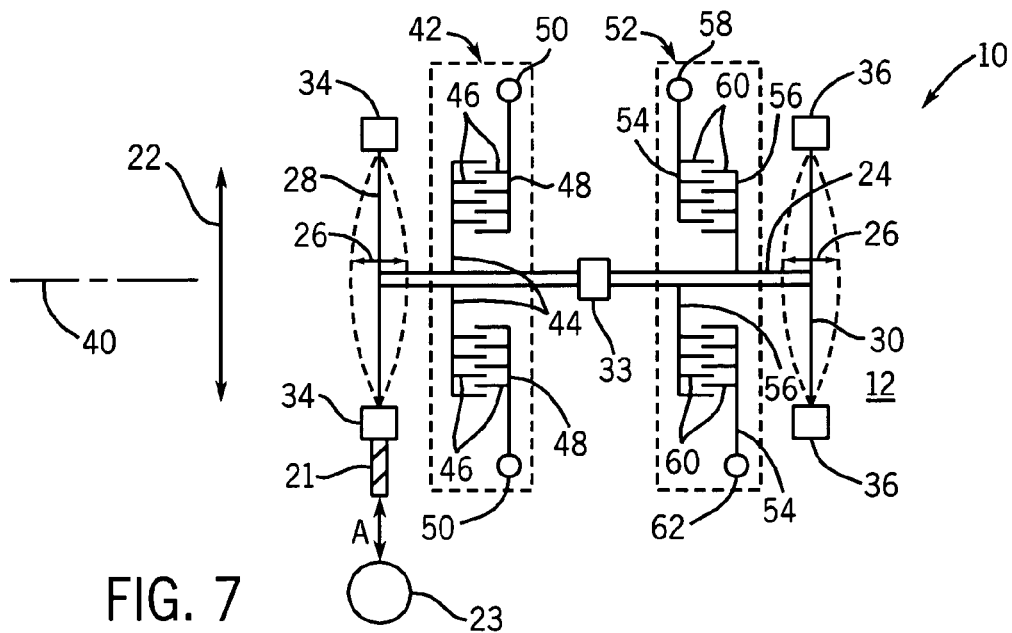
FIG. 7 is a MEMS strain gauge similar to the type illustrated in FIG. 2A, but includes a flexible transverse arm adjustment mechanism for determining strain.

Referring now to FIG. 7, the present invention further contemplates that one of pylons 34 can be connected to one end of a movable arm 21 whose other end is connected to a displacement generator 23 that extends and retracts arm 21 in the direction of arrow A in response to a source voltage or current. Microprocessor 71 can be provided with a calibrated curve that correlates source input to generator 23 and corresponding amount and direction of arm 21 movement as a function of underlying strain. Accordingly, during operation, a pulse can be applied to beam 24, thereby causing the beam to oscillate as described above. The position of arm 21 can then be adjusted until detector 52 determines that the beam 24 is oscillating at the resonant frequency. The source input to generator 23 can then be measured, and the processor can then determine the strain on the underlying object as a function of arm 21 displacement to maintain oscillation at the resonant frequency.

The present invention recognizes that MEMS device 10 can detect strain that may be a function of environmental changes, such as temperature, component drift, and other effects, as opposed to strain in the underlying device. The environmental effects can be negated by providing a second dummy MEMS strain gauge constructed similar to strain gauge 10 illustrated in accordance with any of the embodiments above. One of the pylons 34 would not be connected to the underlying substrate, and thus would not produce an output as a function of underlying strain. Rather, the output of the dummy MEMS device would reflect only environmental changes. Because the environmental changes in the dummy device would also be experienced by the real-time sensor 10, strain calculated in the dummy device can be subtracted from the strain experienced in the real-time sensor 10 to provide a measurement that is a representation of only the strain of the underlying object. The concept of a dummy device to negate environmental effects is further described in U.S. Pat. No. 6,617,750, issued on Sep. 9, 2003, the disclosure of which is hereby incorporated by reference as if set forth in its entirety herein.

Figure 6A:
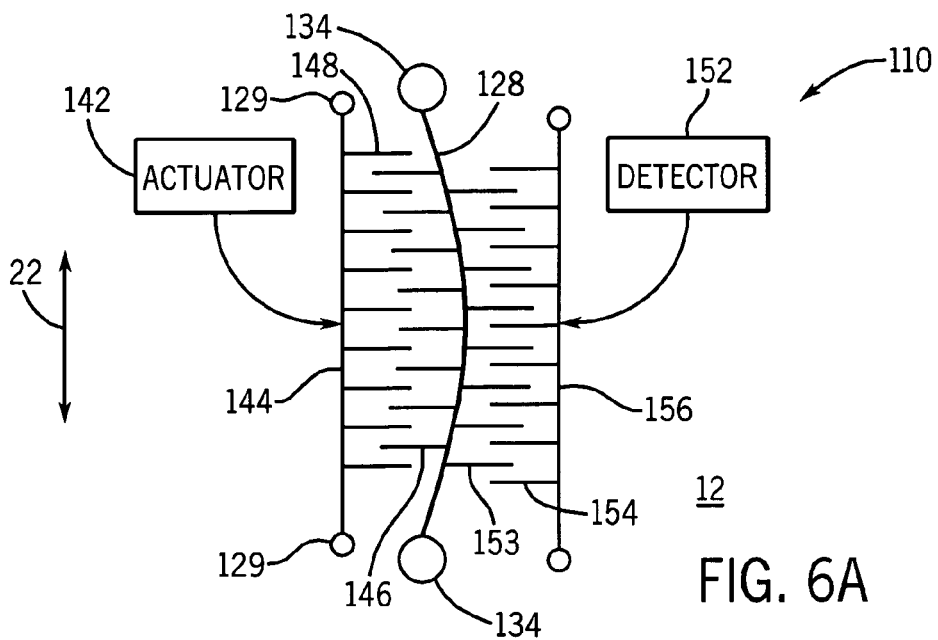
FIG. 6A is a schematic representation of the MEMS strain gauge constructed in accordance with an alternate embodiment showing a fixed arm that is stressed from an underlying object strain, wherein the fixed arm carries an actuator for applying force to the transverse flexible arm and a detector for detecting movement of the transverse flexible arm.
Figure 6B:
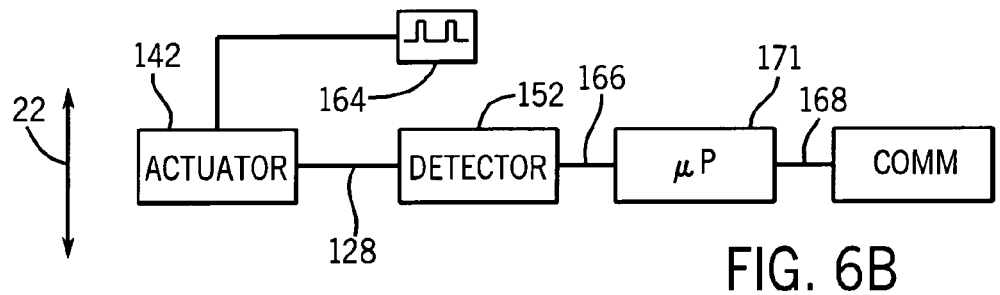

Referring now to FIGS. 6A and 6B, the present invention recognizes that a MEMS strain gauge 110 can be simplified with respect to strain gauge 10 illustrated above. In particular, strain gauge 110 includes a transverse arm 128 that is connected to the underlying substrate 12 via pylons 134. Arm 128 extends generally in the direction of strain axis 22. Arm 128 carries movable capacitor fingers 146 extending to the left of arm 128 that are interdigitated with stationary capacitor fingers 148 of a fixed capacitor plate 144. Capacitor plate 144 is attached to pylons 129 that are, in turn, attached to the substrate 12. Accordingly, a pulse can be applied from an actuator 142 onto capacitor plate 144 to create a momentary voltage differential across fingers 146 and 148, thereby causing arm 128 to oscillate.

Arm 128 further includes a plurality of capacitor fingers 153 extending to the right of arm 128 that are interdigitated with stationary capacitor fingers 154 of a fixed capacitor plate 156. Accordingly, a detector 152 can measure the capacitance formed between arm 128 and plate 156. Microprocessor 171 can then determine the strain of the underlying device by counting the number of crossings at a predetermined capacitance value over a period of time. The predetermined capacitance value can be, for example, a calibrated value when fingers 153 and 154 are disposed in a neutral position. The calculated oscillation frequency can be used in accordance with any of the methods described above to determine strain of the underlying object.

Strain gauge 110 can be further simplified by removing one of the capacitor plates 146 and 153 along with the corresponding capacitor plate 144 and 156. Accordingly, for example, only fingers 146, 148, and capacitor plate 144 would remain. Plate 144 could then function as both an actuator and detector by first applying a pulse to arm 128 in the manner described above. After the applied pulse, the capacitance between plate 144 and arm 128 can be sensed as arm 128 oscillates and the strain of the underlying device can be calculated in the manner described above until the oscillation decays to zero, at which time a pulse would again be applied to plate 144.

Referring to FIG. 1, as fabricated, a MEMS strain gauge in accordance with any of the above embodiments may be protected by a cover 14 attached to the top of the substrate 12 of a type as described in U.S. patent application Ser. No. 09/842,975 filed Apr. 26, 2001, assigned to the assignee of the present invention and hereby incorporated by reference. Electrical leads 19 provide for connection to the internal structure of the MEMS strain gauge 10. The pylons 34, 50, 58, 62, and 36 may be electrically connected to the leads 19 of the MEMS strain gauge or to other circuitry fabricated monolithically on or attached to the substrate 12. The cover 14 can define an enclosure for a vacuum that would control the damping which determines the oscillation decay rate. Cover 14 can also enclose any gas, such as argon, nitrogen, or other, and at any pressure, above or below atmospheric pressure, to control the mechanical damping of MEMS structure.

A link 16 being, for example, a machined aluminum plate, may be attached to the substrate 12 by epoxy 18 or the like so that stress on the link 16 is transferred in part to the substrate 12. The link 16 may include mounting provisions, such as holes 20, aligned with a longitudinal or strain axis 22 along which stress will be exerted on the link 16 causing a corresponding strain in the link 16 and substrate 12. Alternatively, the MEMS strain gauge 10 may be mounted directly on a device to be placed under stress such as a beam, cable, wire, rope, motor stator winding, or the like.

When the link 16 is used, it may be incorporated into a device such as a load cell or fastened to another object from which strain will be obtained. The attachment may be according to methods well known in the art for attaching resistive strain gauges. Alternatively, substrate 12 could be attached directly onto the device.

The cover 14 may include indicia 15 indicating the direction of sensitivity of the internal structure of the MEMS strain gauge 10 and aligned with the strain axis 22.

Figure 5:
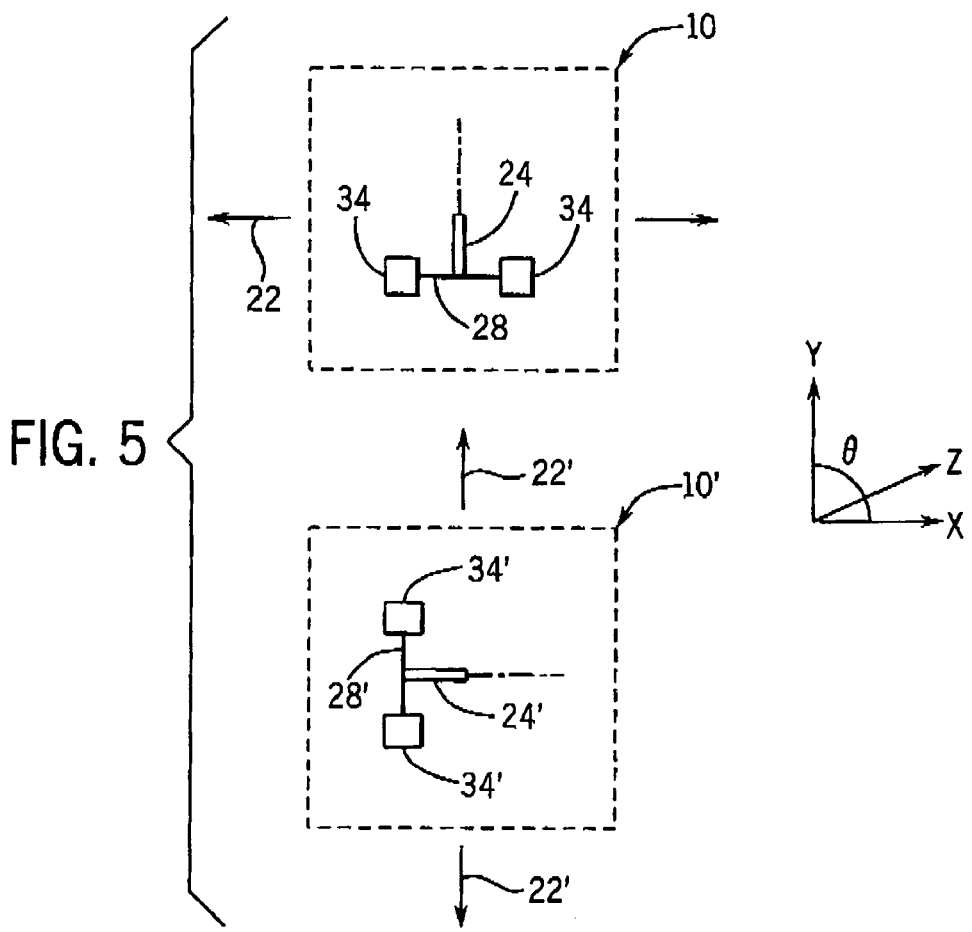
FIG. 5 is a diagram showing the orientation of two MEMS strain gauges of FIGS. 3 and 4 oriented to detect strain in two directions.

Referring now to FIG. 5, several directions of strain measurements may be accommodated by the use of two strain gauge devices 10 placed on the substrate 12 in perpendicular orientation or, not shown, two MEMS strain gauges 10 placed in perpendicular orientation on a link 16. That is, the strain axes 22 of one MEMS strain gauge 10 is oriented to be perpendicular to the strain axes 22' of the second MEMS strain gauge 10'. Alternatively, an array of strain gauges 10 can be offset from perpendicular by any angle θ between 0 and 90 degrees along the x, y, and z directions as illustrated. Accordingly, an array of strain gauges can provide a three-axis strain gauge when embedded in a material. Furthermore, one or more strain gauges can be attached to a device such that opposite sides of the strain gauge(s) 10 are mounted on opposite sides of a shear line. Accordingly, strain sensed by the strain gauge(s) 10 will indicate shear strain levels.

It should furthermore be appreciated that, when strain gauge 10 is equipped with communication module 69, all strain gauges can communicate with a central processor which could either replace, or be provided in addition to, local microprocessor 71. The centralized processor can receive strain levels from each connected strain gauge 10 and plot strain levels throughout a device, and furthermore can time synchronize the strain at various locations on the device. The centralized processor could further connect to strain gauges of multiple devices.

It should further be appreciated that a plurality of MEMS strain gauges 10 can be dispersed either on one or multiple links 16, and attached to an underlying device to measure strain in multiple directions at a plurality of locations on the device. For instance, the strain gauge(s) 10 can be mounted onto various surfaces of a device that undergo strain, or alternatively can be disposed in a beam, cable, wire, rope, or the like.

The invention has been described in connection with what are presently considered to be the most practical and preferred embodiments. However, the present invention has been presented by way of illustration and is not intended to be limited to the disclosed embodiments. In order to apprise the public of the scope of the present invention, the following claims are provided.

We claim:

1. A microelectromechanical system (MEMS) strain gauge providing measurement of strain of an object, the strain gauge comprising:
    a substrate having a surface attachable to the object;
    a longitudinally extending beam;
    at least one flexible arm having first and second ends attached to the substrate and having a middle portion supporting the beam above the substrate; a first actuator connected to the beam to apply a force to the beam;
    a detector connected to the beam for detecting a frequency of vibration of the beam to provide a measure of strain of the object; and
    an insulating bridge defined in the beam between the first actuator and the detector.

2. The MEMS strain gauge as recited in claim 1, wherein the detected frequency is a resonant frequency of vibration of the beam.

3. The MEMS strain gauge as recited in claim 2, further comprising a microprocessor coupled to the detector to calculate the strain at the arm as a function of the resonant frequency of the arm.

4. The MEMS strain gauge as recited in claim 1, further comprising a second actuator connected to the beam for providing a force to the beam in a direction opposite the force provided by the first actuator.

5. The MEMS strain gauge as recited in claim 1, wherein the detector comprises a set of movable capacitor plates connected to the beam and a set of stationary capacitor plates in opposition to the movable capacitor plates and a capacitance sensing circuit.

6. The MEMS strain gauge as recited in claim 1, wherein the applied force induces vibration in the beam.

7. The MEMS strain gauge as recited in claim 6, wherein the applied force is an impulse that induces vibration in the beam at a resonant frequency of the beam.

8. The MEMS strain gauge as recited in claim 6, wherein the first actuator comprises a set of movable capacitor plates connected to the beam and a set of stationary capacitor plates in opposition to the movable capacitor plates.

9. The MEMS strain gauge as recited in claim 8, wherein the movable and stationary capacitor plates have interdigitating fingers.

10. The MEMS strain gauge as recited in claim 8, wherein the first actuator further comprises a pulse generator connected across the movable and stationary capacitor plates and operable to momentarily charge the capacitor plates to produce the force.

11. The MEMS strain gauge as recited in claim 8, wherein the first actuator further comprises a variable ac oscillator connected across the movable and stationary capacitor plates and operable to maintain oscillation at a resonant frequency of the transverse arm.

12. The MEMS strain gauge as recited in claim 8, wherein the first actuator further comprises an ac oscillator connected across the movable and stationary capacitor plates and operable to maintain oscillation at a predetermined frequency of the transverse arm.

13. A microelectromechanical system (MEMS) strain gauge providing measurement of strain of an object, the strain gauge comprising:
    a substrate having a surface attachable to the object;
    a longitudinally extending beam;
    at least one flexible arm having first and second ends attached to the substrate and having a middle portion supporting the beam above the substrate;
    a first actuator communicating with the beam to apply a force to the beam, the applied force inducing vibration in the beam, the first actuator comprising:
    a set of movable capacitor plates connected to the beam and a set of stationary capacitor plates in opposition to the movable capacitor plates; and
    an AC oscillator connected across the movable and stationary capacitor plates and operable to maintain oscillation at a predetermined frequency of the transverse arm;
    a detector communicating with the beam for detecting a frequency of vibration of the beam to provide a measure of strain of the object; and
    a microprocessor coupled to the detector to calculate the strain at the arm as a function of the amplitude of motion of the beam as it vibrates at the predetermined frequency.

14. A microelectromechanical system (MEMS) strain gauge providing measurement of strain of an object, the strain gauge comprising:
    a substrate having a surface attachable to the object;
    a longitudinally extending beam;
    at least one flexible arm having first and second ends attached to the substrate and having a middle portion supporting the beam above the substrate;
    a detector communicating with the beam for detecting a resonant frequency of vibration of the beam to provide a measure of strain of the object; and
    microprocessor coupled to the detector to calculate the strain at the arm as a function of the resonant frequency of the arm.

15. The MEMS strain gauge as recited in claim 14, wherein the microprocessor further comprises a frequency measurement counter counting cycles of capacitance variation for a predetermined time period.

16. The MEMS strain gauge as recited in claim 15, wherein the microprocessor calculates an amplitude of motion and maintains the frequency at a specific frequency.

17. The MEMS strain gauge as recited in claim 16, wherein the specific frequency is a resonant frequency.

18. The MEMS strain gauge as recited in claim 1, wherein the beam is centered on the arm between the first and second ends of the flexible arm.

19. The MEMS strain gauge as recited in claim 1, wherein the flexible arm supports the beam at a first end of the beam, and wherein the strain gauge further includes a second flexible arm having first and second ends attached to the substrate and having a middle supporting the beam above the substrate at a second end of the beam.

20. The MEMS strain gauge as recited in claim 1, wherein the arm is electrically isolated from the object.

21. The MEMS strain gauge as recited in claim 1, further including:
   a second flexible arm having first and second ends attached to the substrate and having a middle supporting the beam above the substrate; and
   a detector communicating with the arm for detecting a frequency of vibration of the second arm to provide a measure of strain of the object.

22. A method for sensing the strain of an object using a MEMS strain gauge including a longitudinally extending beam suspended over a substrate by an arm connected at two separated ends to the substrate along a transverse axis, the method comprising the steps of:
   A) attaching the substrate to the object with the transverse axis aligned with a direction of strain measurement in the object so that strain of the object causes strain in the substrate;
   B) providing a momentary force to the beam with an actuator connected at a first point along the beam, thereby causing the beam to vibrate at a frequency, wherein the frequency of vibration is dependent upon the strain of the substrate and object;
   C) measuring the frequency of vibration with a detector connected at a second point along the beam, the second point being electrically isolated from the first point; and
   D) based on the measured frequency of vibration, determining the strain of the object.

23. The method as recited in claim 22, wherein step (B) further comprises causing the arm to vibrate at a resonant frequency.

24. The method as recited in claim 23, wherein step (C) further comprises measuring the resonant frequency of vibration.

25. The method as recited in claim 24, wherein step (D) further comprises determining the strain of the object based on the measured resonant frequency of vibration.

26. A method for sensing the strain of an object using a MEMS strain gauge including a longitudinally extending beam suspended over a substrate by an arm connected at two separated ends to the substrate along a transverse axis, the method comprising the steps of:
   A) attaching the substrate to the object with the transverse axis aligned with a direction of strain measurement in the object so that strain of the object causes strain in the substrate;
   B) providing a momentary force to the arm, thereby causing the arm to vibrate at a frequency, wherein the frequency of vibration is dependent upon the strain of the substrate and object;
   C) measuring the frequency of vibration; and
   D) based on the measured frequency of vibration, determining the strain of the object by adjusting a displacement of the arm to maintain the vibration at a predetermined frequency, and determining the strain based on the amount of displacement.

27. A microelectromechanical system (MEMS) strain gauge providing measurement of strain of an object, the strain gauge comprising:
   a substrate having a surface attachable to the object;
   at least one flexible arm having first and second ends attached to the substrate, wherein the arm oscillates in response to a stimulus;
   a detector communicating with the arm for detecting a resonant frequency of oscillation of the arm; and
   a microprocessor coupled to the detector to determine a measure of strain of the object as a function of the resonant frequency of the arm; and wherein the detector comprising a capacitor plate interfacing with the arm.

28. The MEMS strain gauge as recited in claim 27, wherein the detector measures capacitance across the capacitor plate and the arm.

29. The MEMS strain gauge as recited in claim 28, further comprising a microprocessor coupled to the detector and calculating an oscillation frequency of the flexible arm.

30. The MEMS strain gauge as recited in claim 27, wherein the flexible arm carries a plurality of capacitor fingers, and wherein the detector comprises a capacitor plate carrying a plurality of capacitor fingers interdigitating with the capacitor fingers of the flexible arm.

31. The MEMS strain gauge as recited in claim 27, further comprising an actuator capable of applying a force causing the flexible arm to oscillate.

32. The MEMS strain gauge as recited in claim 27, wherein the arm carries a plurality of capacitor fingers, and wherein the actuator comprises a capacitor plate carrying a plurality of capacitor fingers that are interdigitated with the capacitor fingers of the arm.

33. The MEMS strain gauge as recited in claim 32, wherein a momentary voltage is applied across the capacitor plate.

34. The MEMS strain gauge as recited in claim 33, wherein the capacitance across the interdigitated fingers is sensed after the voltage is applied.

35. The MEMS strain gauge as recited in claim 34, wherein an oscillation frequency is determined based on the sensed capacitance.

36. The MEMS strain gauge as recited in claim 35, wherein the strain is determined based on the oscillation frequency.

* * * * *